United States Patent
Miyashita et al.

(10) Patent No.: US 10,408,644 B2
(45) Date of Patent: Sep. 10, 2019

(54) OPTICAL FIBER TEMPERATURE SENSOR AND METHOD FOR MANUFACTURING SAME

(71) Applicant: MITSUBISHI ELECTRIC CORPORATION, Chiyoda-ku (JP)

(72) Inventors: Masahiro Miyashita, Chiyoda-ku (JP); Kazushi Sekine, Chiyoda-ku (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 16/077,655

(22) PCT Filed: Feb. 23, 2017

(86) PCT No.: PCT/JP2017/006878
§ 371 (c)(1),
(2) Date: Aug. 13, 2018

(87) PCT Pub. No.: WO2017/150339
PCT Pub. Date: Sep. 8, 2017

(65) Prior Publication Data
US 2019/0049271 A1    Feb. 14, 2019

(30) Foreign Application Priority Data
Mar. 4, 2016  (JP) .................. 2016-041923

(51) Int. Cl.
*G01D 5/353*   (2006.01)
*G01K 11/32*   (2006.01)
(Continued)

(52) U.S. Cl.
CPC ......... *G01D 5/353* (2013.01); *F28D 15/0275* (2013.01); *G01B 11/16* (2013.01);
(Continued)

(58) Field of Classification Search
CPC ................. G01K 11/32; C03C 3/085
(Continued)

(56) References Cited

U.S. PATENT DOCUMENTS

2004/0105618 A1*   6/2004   Lee ............... G02B 6/0218
                                                        385/37
2004/0184737 A1*   9/2004   Oono .............. G02B 6/4201
                                                        385/52
2011/0280280 A1*  11/2011  Kochergin .......... G01K 11/32
                                                        374/161

FOREIGN PATENT DOCUMENTS

JP    2001-42142 A    2/2001
JP    2001-194249 A   7/2001
(Continued)

OTHER PUBLICATIONS

International Search Report dated May 30, 2017 in PCT/JP2017/006878 filed Feb. 23, 2017.

*Primary Examiner* — Fabricio R Murillo Garcia
(74) *Attorney, Agent, or Firm* — Oblon, McClelland, Maier & Neustadt, L.L.P.

(57) ABSTRACT

An optical fiber temperature sensor includes: a substrate having a first substrate main body, and a second substrate main body, which has a coefficient of thermal expansion larger than that of the first substrate main body, and is bonded to the first substrate main body; and an optical fiber having a FBG sensor portion for measuring a temperature from a relationship between a Bragg wavelength and the temperature, and the optical fiber is configured to be embedded in the second substrate main body so that the FBG sensor portion is positioned in the second substrate main body.

7 Claims, 7 Drawing Sheets

(51) Int. Cl.
  *F28D 15/02* (2006.01)
  *G01B 11/16* (2006.01)
  *G01K 11/12* (2006.01)

(52) U.S. Cl.
  CPC .............. *G01K 11/12* (2013.01); *G01K 11/32* (2013.01); *G01K 11/3206* (2013.01); *F28F 2200/005* (2013.01)

(58) Field of Classification Search
  USPC .................................................. 340/870.17
  See application file for complete search history.

(56) References Cited

FOREIGN PATENT DOCUMENTS

| | | |
|---|---|---|
| JP | 2003-14491 A | 1/2003 |
| JP | 2009-300378 A | 12/2009 |
| JP | 2013-156200 A | 8/2013 |

\* cited by examiner

OPTICAL FIBER TEMPERATURE SENSOR AND METHOD FOR MANUFACTURING SAME

TECHNICAL FIELD

The present invention relates to an optical fiber temperature sensor including an optical fiber embedded in a substrate, and a method of manufacturing the sensor.

BACKGROUND ART

For a structure of an artificial satellite, a honeycomb sandwich structure formed of skin materials made of fiber reinforced plastic and a honeycomb core, which is lightweight with high stiffness, is generally used. In particular, the honeycomb sandwich structure having high stiffness is used in a mission mounted structure.

However, thermal deformation occurs in the honeycomb sandwich structure owing to a change in thermal environment on an orbit resulting from, for example, input of sunlight heat and heat generation of mounted equipment. Therefore, an angle of an Earth-oriented axis in mission equipment, such as a camera and an antenna, mounted on an artificial satellite varies. In particular, in a stationary satellite located about 36,000 kilometers away from the Earth, even a slight variation in the angle of the oriented axis significantly lowers accuracy of Earth observation and positioning.

Therefore, it is important to maintain a temperature of the honeycomb sandwich structure as uniform as possible through thermal control using a heater or the like so as to suppress the thermal deformation. It is also necessary to measure the temperature of the honeycomb sandwich structure on the orbit with high density and high accuracy so that precise thermal control is implemented.

Here, an optical fiber temperature sensor is given as one sensor configured to evaluate the temperature of a structure, such as the honeycomb sandwich structure. The optical fiber temperature sensor is a temperature sensor having the following features. The sensor has a small size and is lightweight, is strong against electromagnetic noise, and enables multipoint measurement. In addition, the optical fiber temperature sensor is, for example, a sensor using, as a sensor portion, a fiber Bragg grating (FBG) in which the Bragg wavelength of a reflectance spectrum changes with a temperature and a strain.

In general, in a system mounted with the optical fiber temperature sensor, a relationship between a Bragg wavelength and a temperature is actually measured in advance. A general optical fiber temperature sensor is configured to calculate a temperature corresponding to an acquired Bragg wavelength from the relationship between the Bragg wavelength and the temperature actually measured in advance.

An example of the configuration of the optical fiber temperature sensor is a configuration obtained by embedding a FBG sensor portion in a substrate made of carbon fiber reinforced plastic (CFRP) (see, for example, Patent Literature 1). The optical fiber temperature sensor described in Patent Literature 1 is configured to calculate a temperature from a relationship between a Bragg wavelength and the temperature.

In addition, another example of the configuration of the optical fiber temperature sensor is a configuration obtained by bonding a FBG sensor portion onto a bimetal (see, for example, Patent Literature 2). The optical fiber temperature sensor described in Patent Literature 2 is configured to calculate a temperature from a relationship between a strain caused in the bimetal by a temperature change and the temperature change through the utilization of a characteristic in which a Bragg wavelength changes with a strain.

CITATION LIST

Patent Literature

[PTL 1] JP 2009-300378 A (for example, see FIG. 14)
[PTL 2] JP 2001-194249 A (for example, see FIG. 1)

SUMMARY OF INVENTION

Technical Problem

However, the related art has the following problems.

As described above, in the related art described in Patent Literature 1, the sensor is configured so that the FBG sensor portion is embedded in the substrate made of CFRP. In the case of such configuration, there occurs a problem in that because of the characteristics of the optical fiber temperature sensor, a Bragg wavelength change caused by a temperature change becomes smaller in the temperature region of −50° C. or less (hereinafter referred to as "extremely low temperature region"), and as a result, the sensitivity of the sensor reduces.

In the related art described in Patent Literature 2, the sensor is configured to monitor a strain occurring as a result of the deformation of the plate-like bimetal and to convert the strain into a temperature. In the case of such configuration, there occurs a problem in that it is difficult to apply the configuration to temperature measurement in a wide temperature region like a space environment (e.g., the range of from −170° C. or more to 150° C. or less) because the strain caused by the plate-like bimetal is limited. In the related art described in Patent Literature 2, it is assumed that the region of temperature measurement by the optical fiber temperature sensor falls within the range of from −20° C. or more to 40° C. or less, and hence the width of the temperature region is 60° C.

In addition, the related art described in Patent Literature 2 involves a problem in that it is difficult to widen the region of the temperature measurement by the optical fiber temperature sensor because the number of kinds of design obtained merely by changing the combination of metals in the bimetal is limited.

Further, in the related art described in Patent Literature 2, the FBG sensor portion is in an exposed state because the sensor is configured by bonding the FBG sensor portion to the bimetal. As a result, there occurs a problem in that the FBG sensor portion is liable to be damaged by, for example, impact due to the collision of a person or an object with the FBG sensor portion during assembly work for a satellite. In addition, there occurs a problem in that the FBG sensor portion is liable to be damaged by, for example, rubbing between an outer frame or a heat insulator and the FBG sensor portion due to vibration at the time of the conveyance of the sensor.

The present invention has been made to solve such problems as described above, and an object of the present invention is to provide an optical fiber temperature sensor that can suppress the damage of a FBG sensor portion by, for example, impact from the outside while achieving high-accuracy temperature measurement in a wide temperature region, and a method of manufacturing the sensor.

Solution to Problem

According to one embodiment of the present invention, there is provided an optical fiber temperature sensor, including: a substrate having a first substrate main body, and a second substrate main body, which has a coefficient of thermal expansion larger than that of the first substrate main body, and is bonded to the first substrate main body; and an optical fiber having a FBG sensor portion for measuring a temperature from a relationship between a Bragg wavelength and the temperature, wherein the optical fiber is embedded in the second substrate main body so that the FBG sensor portion is positioned in the second substrate main body.

According to another embodiment of the present invention, there is provided a method of manufacturing an optical fiber temperature sensor, the optical fiber temperature sensor including: a substrate having a first substrate main body, and a second substrate main body, which has a coefficient of thermal expansion larger than that of the first substrate main body, and is bonded to the first substrate main body; and an optical fiber having a FBG sensor portion for measuring a temperature from a relationship between a Bragg wavelength and the temperature, with first prepregs for the first substrate main body and second prepregs for the second substrate main body, the method including the steps of: sequentially laminating the first prepregs to produce a first forming material; sequentially laminating the second prepregs on the first forming material, followed by further sequential lamination of the second prepregs under a state in which the optical fiber is arranged so that the FBG sensor portion is positioned on the second prepregs that are laminated, to thereby produce a second forming material; and heating the first forming material and the second forming material under pressure.

Advantageous Effects of Invention

According to the present invention, the optical fiber temperature sensor that can suppress the damage of a FBG sensor portion by, for example, impact from the outside while achieving high-accuracy temperature measurement in a wide temperature region, and the method of manufacturing the sensor can be provided.

DESCRIPTION OF EMBODIMENTS

Now, an optical fiber temperature sensor and a method of manufacturing the optical fiber temperature sensor according to the present invention are described based on exemplary embodiments with reference to the drawings. In the description of the drawings, the same components are denoted by the same reference symbols, and the overlapping description thereof is herein omitted.

First Embodiment

First, an optical fiber 1 serving as one component of an optical fiber temperature sensor in the first embodiment is described with reference to FIG. 5 to FIG. 8.

Figure 5:
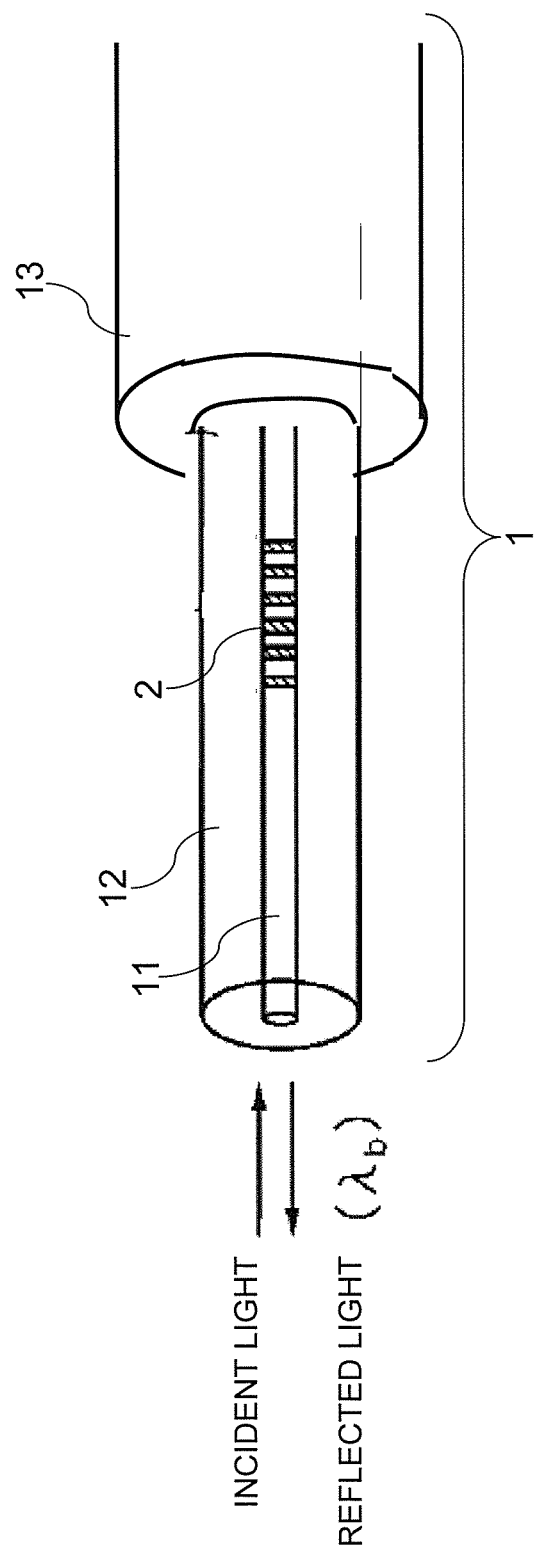
FIG. 5 is a schematic view for illustrating the configuration of an optical fiber in the first embodiment of the present invention.
Figure 6:
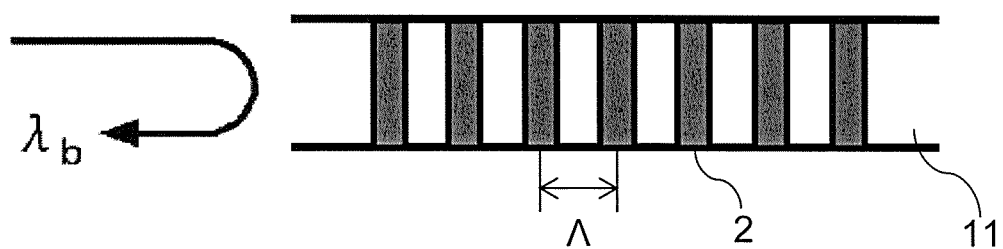
FIG. 6 is an enlarged schematic view of the FBG sensor portion of FIG. 5.
Figure 7:
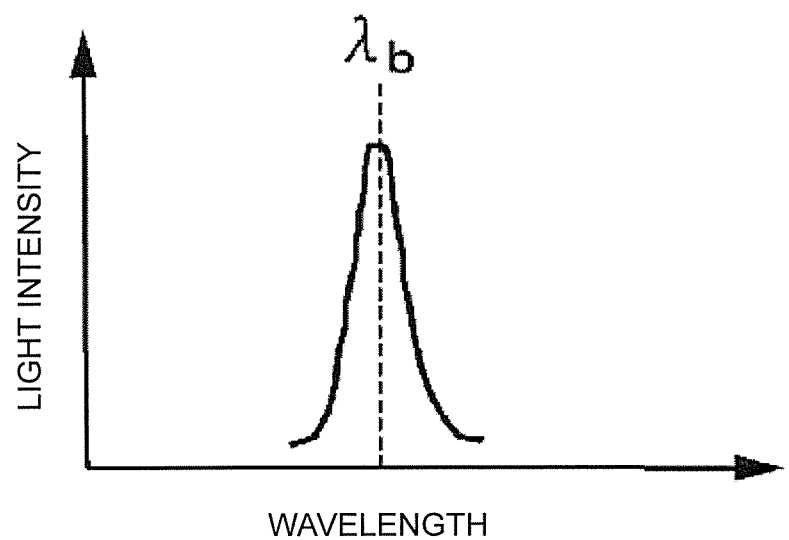
FIG. 7 is a schematic graph for showing the reflectance spectrum characteristic of the FBG sensor portion of FIG. 5.
Figure 8:
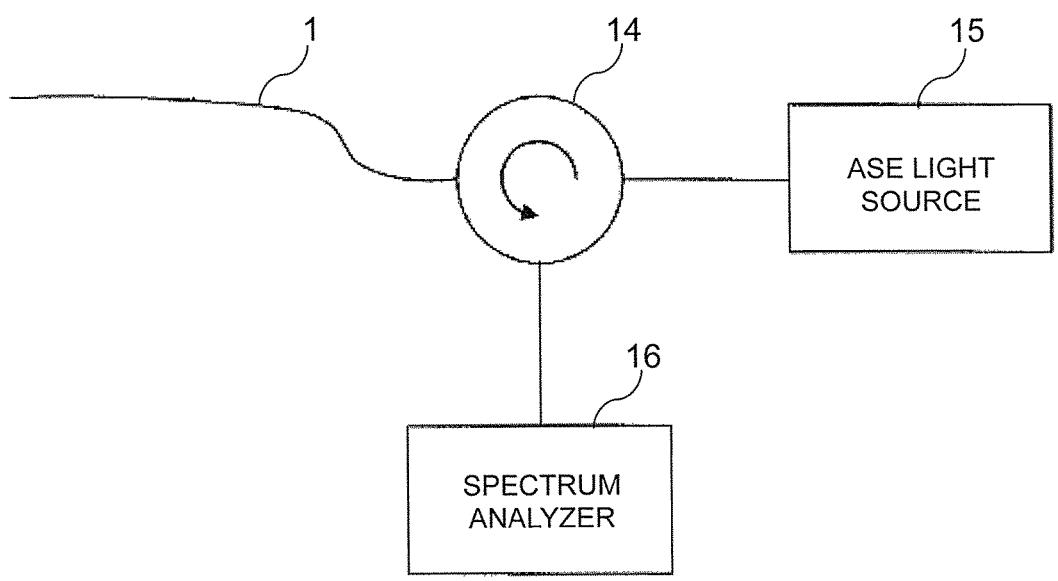
FIG. 8 is a schematic view of a temperature measurement system using the optical fiber of FIG. 5.

FIG. 5 is a schematic view for illustrating the configuration of the optical fiber 1 in the first embodiment of the present invention. FIG. 6 is an enlarged schematic view of FBG sensor portion 2 of FIG. 5. FIG. 7 is a schematic graph for showing the reflectance spectrum characteristic of the FBG sensor portion 2 of FIG. 5. FIG. 8 is a schematic view of a temperature measurement system using the optical fiber 1 of FIG. 5.

In FIG. 5, the optical fiber 1 has: the FBG sensor portion 2 for measuring a temperature from a relationship between a Bragg wavelength and the temperature; a core 11; a clad 12 covering the outer circumference of the core 11; and a coating 13 covering the outer circumference of the clad 12. The FBG sensor portion 2 is formed in the core 11. A material for the coating 13 is, for example, an acrylate resin or a polyimide resin.

The optical fiber 1 has the following configuration: in the outer circumference of the clad 12, the coating 13 is removed from the vicinity of the FBG sensor portion 2, and hence the clad 12 is exposed. Therefore, in the optical fiber 1, the diameter of the vicinity of the FBG sensor portion 2 is smaller than the diameter of any other portion by an amount corresponding to the removed coating 13. For example, the diameter of the entirety of the optical fiber 1 can be set to about 250 µm, the diameter of the clad 12 can be set to about 125 µm, and the diameter of the core 11 can be set to about 10 µm. In addition, the FBG sensor portion 2 can be formed in the core 11 over a range of, for example, about 5 mm.

The FBG sensor portion 2 is a structure to be formed in the core 11 so that the refractive index of the core 11 periodically changes and has a feature in that a steep reflectance spectrum characteristic is obtained. Specifically, a refractive index of the core 11 changes with a period Λ as illustrated in FIG. 6, and the steep reflectance spectrum characteristic is obtained as shown in FIG. 7. A light intensity becomes the largest at a center wavelength (Bragg wavelength: $\lambda_B$) of the reflectance spectrum.

Here, a relationship between the center wavelength (Bragg wavelength: $\lambda_B$) of the reflectance spectrum, the period A, and a refractive index n is expressed by Expression (1). In addition, the refractive index n depends on the temperature, whereas the period A depends on the temperature and the strain.

$$\lambda_B = 2\pi\lambda \quad (1)$$

Therefore, when the relationship between the Bragg wavelength and the temperature is measured after the FBG sensor portion 2 has been configured so as not to be affected by any strain by being covered with a tube or the like, the temperature can be measured from the Bragg wavelength.

Subsequently, an example of the temperature measurement system for evaluating a temperature is described with reference to FIG. 8. As illustrated in FIG. 8, the temperature measurement system includes: the optical fiber 1; an optical circulator 14; an amplified spontaneous emission (ASE) light source 15; and a spectrum analyzer 16.

At the time of temperature measurement, the optical circulator 14 configured to covert an optical path is connected to the base end portion of the optical fiber 1. In addition, the ASE light source 15 serving as a broadband light source and the spectrum analyzer 16 serving as a wavelength measurement device are connected to the optical circulator 14. A Bragg wavelength can be accurately measured by configuring such system. In addition, as described in the foregoing, the temperature can be determined by measuring the Bragg wavelength.

Figure 11:
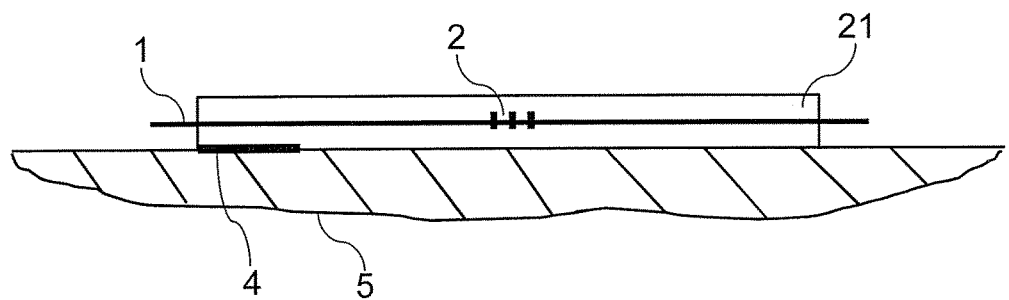
FIG. 11 is a sectional view for illustrating the configuration of an optical fiber temperature sensor obtained by applying the related art described in Patent Literature 1.
Figure 12:
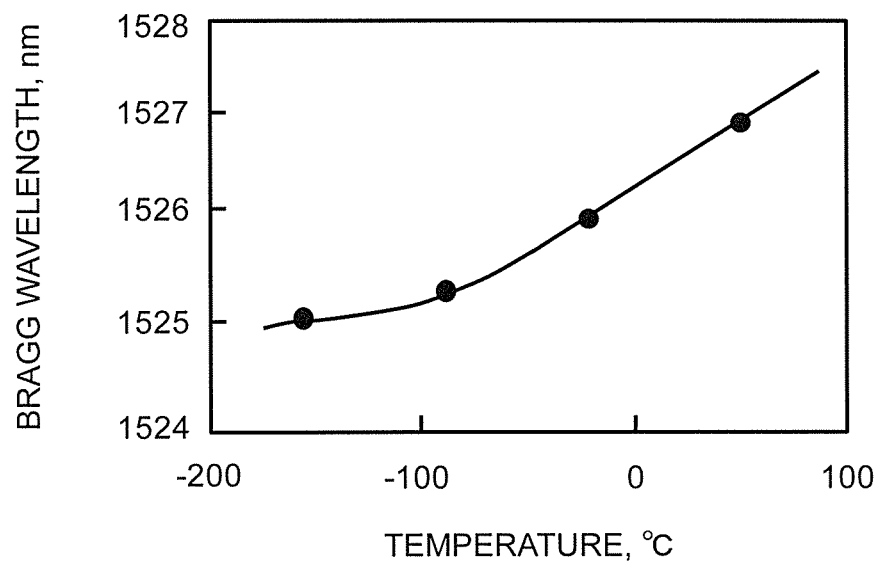
FIG. 12 is a graph for showing a relationship between a Bragg wavelength and a temperature obtained by the configuration of the optical fiber temperature sensor of FIG. 11.
Figure 13:
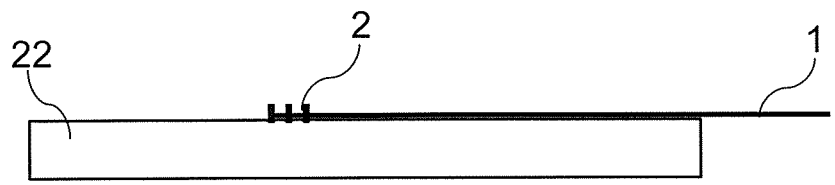
FIG. 13 is a sectional view for illustrating the configuration of an optical fiber temperature sensor obtained by applying the related art described in Patent Literature 2.

Next, a problem with an optical fiber temperature sensor adopting a conventional configuration to which the inventors of the present invention have newly paid attention for clarifying the technical feature of the optical fiber temperature sensor of the invention of the present application is described with reference to FIG. 11 to FIG. 13. FIG. 11 is a sectional view for illustrating the configuration of an optical fiber temperature sensor obtained by applying the related art described in Patent Literature 1. FIG. 12 is a graph for showing a relationship between a Bragg wavelength and a temperature obtained by the configuration of the optical fiber temperature sensor of FIG. 11. FIG. 13 is a sectional view for illustrating the configuration of an optical fiber temperature sensor obtained by applying the related art described in Patent Literature 2.

In FIG. 11, the optical fiber temperature sensor includes a substrate 21 made of CFRP and the optical fiber 1 having the FBG sensor portion 2. The optical fiber 1 is embedded in the substrate 21 so that the FBG sensor portion 2 is positioned in the substrate 21. In addition, part of the rear surface of the substrate 21 is bonded to a temperature evaluation object 5 serving as an object of a temperature evaluation by an adhesive 4. The optical fiber temperature sensor illustrated in FIG. 11 is configured to measure a relationship between a Bragg wavelength and a temperature in advance, and to measure the temperature from the Bragg wavelength in accordance with the relationship.

Here, because of the characteristic of the FBG sensor portion 2, the sensitivity of the sensor reduces in an extremely low temperature region. Specifically, it has been known that while the sensitivity of the sensor is generally about 0.01 nm/° C. in the temperature region of from 50° C. or more to 200° C. or less, the sensitivity of the sensor is about 0.005 nm/° C., that is, reduces by half in the extremely low temperature region, though the sensitivity varies depending on the kind of the FBG sensor portion 2.

In view of the foregoing, a method involving forcibly applying a compressive strain to the FBG sensor portion 2 in the extremely low temperature region to cause the Bragg wavelength to show a smaller value, that is, a method involving enlarging a Bragg wavelength change with a temperature change is conceivable as a method of improving the sensitivity of the sensor in the extremely low temperature region. However, in the configuration illustrated in FIG. 13, that is, a configuration obtained by bonding the FBG sensor portion 2 of the optical fiber 1 onto a bimetal 22, it is difficult to design a value for the compressive strain to be applied to the FBG sensor portion 2 in the extremely low temperature region. This is because the deformation of the bimetal 22 is completed before its temperature reaches the extremely low temperature region.

In addition, the FBG sensor portion 2 cannot be embedded in the bimetal 22, and hence in the configuration illustrated in FIG. 13, the FBG sensor portion 2 is bonded onto the bimetal 22. However, the FBG sensor portion 2 is in exposed state, and hence is liable to be damaged by, for example, impact from the outside.

In view of the foregoing consideration, the inventors have paid attention to a problem in that the optical fiber temperature sensor obtained by applying the related art described in Patent Literature 1 or 2 cannot achieve both an improvement in sensor sensitivity in the extremely low temperature region and the suppression of the damage of the FBG sensor portion.

In view of the foregoing, in the invention of the present application, with a view to solving the problem to which the inventors have newly paid attention, there are provided an optical fiber temperature sensor that can suppress the damage of a FBG sensor portion by, for example, impact from the outside while improving its sensitivity in the extremely low temperature region, and a method of manufacturing the sensor.

Figure 1:
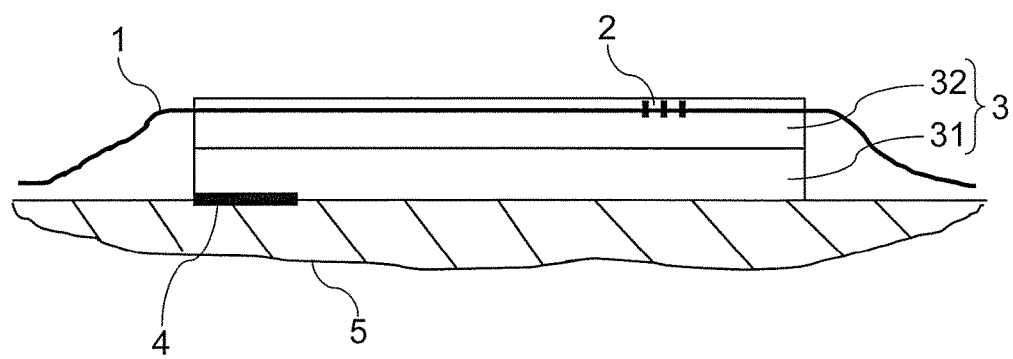
FIG. 1 is a sectional view for illustrating the configuration of an optical fiber temperature sensor in a first embodiment of the present invention.
Figure 2:
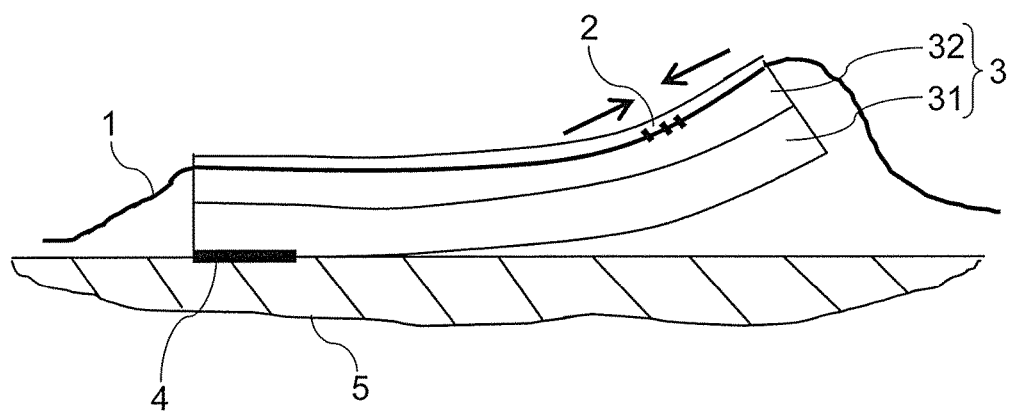
FIG. 2 is a schematic view for illustrating a state in which the substrate of the optical fiber temperature sensor of FIG. 1 curves under an environment in an extremely low temperature region.
Figure 3:
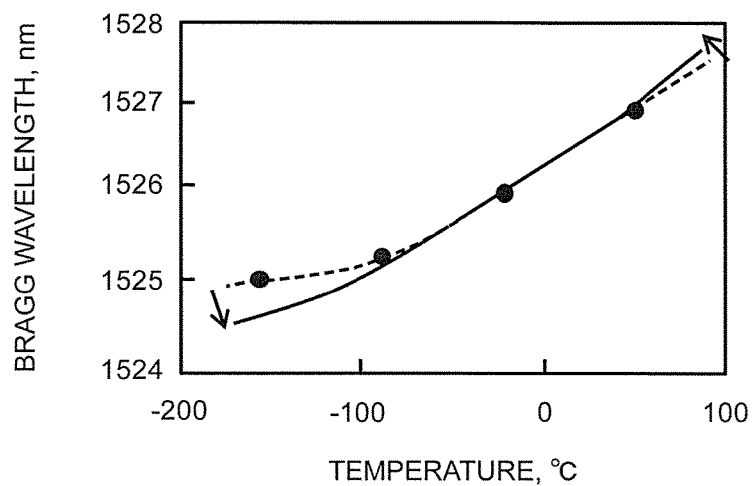
FIG. 3 is a graph for showing a relationship between a Bragg wavelength and a temperature obtained by the configuration of the optical fiber temperature sensor of FIG. 1.

Next, the optical fiber temperature sensor in the first embodiment is described with reference to FIG. 1 to FIG. 3. FIG. 1 is a sectional view for illustrating the configuration of the optical fiber temperature sensor in the first embodiment of the present invention. FIG. 2 is a schematic view for illustrating a state in which a substrate 3 of the optical fiber temperature sensor of FIG. 1 curves under an environment in the extremely low temperature region. FIG. 3 is a graph for showing a relationship between a Bragg wavelength and a temperature obtained by the configuration of the optical fiber temperature sensor of FIG. 1.

In FIG. 1, the optical fiber temperature sensor in the first embodiment includes the optical fiber 1 having the FBG sensor portion 2 and the substrate 3. The substrate 3 has a first substrate main body 31 and a second substrate main body 32.

The coefficient of thermal expansion of the second substrate main body 32 is larger than the coefficient of thermal expansion of the first substrate main body 31. The rear surface of the second substrate main body 32 is bonded to the front surface of the first substrate main body 31. Thus, the substrate 3 has the first substrate main body 31, and the second substrate main body 32, which has a coefficient of thermal expansion larger than that of the first substrate main body 31, and is bonded to the first substrate main body 31.

The optical fiber 1 is embedded in the second substrate main body 32 so that the FBG sensor portion 2 is positioned in the second substrate main body 32. Only a region at one end in the rear surface of the first substrate main body 31 is bonded to the temperature evaluation object 5 by the adhesive 4. Here, it is because an influence of the thermal strain of the temperature evaluation object 5 on the measurement of the temperature of the object is to be avoided that only the region at one end in the rear surface of the first substrate main body 31 is bonded to the temperature evaluation object 5. Examples of the temperature evaluation object 5 include structures, such as a honeycomb sandwich structure.

In the case where the optical fiber temperature sensor is configured as illustrated in FIG. 1, when the temperature reaches the extremely low temperature region, as illustrated in FIG. 2, such warping that the substrate 3 is convex in a downward direction (hereinafter referred to as "forward warping") occurs in the substrate 3 by virtue of a difference in coefficient of thermal expansion between the first substrate main body 31 and the second substrate main body 32. As a result, the substrate 3 curves.

In addition, when the forward warping occurs in the substrate 3, a compressive strain, that is, a compressive stress is applied to the FBG sensor portion 2 embedded in the second substrate main body 32. Thus, the optical fiber 1 is embedded in the second substrate main body 32 so that the compressive stress is applied to the FBG sensor portion 2 in association with the forward warping of the substrate 3. In addition, when the FBG sensor portion 2 is made closer to the surface layer portion of the second substrate main body 32, that is, the front surface of the second substrate main body 32, the compressive stress is more easily applied to the FBG sensor portion 2.

In addition, when the compressive stress is applied to the FBG sensor portion 2, the period A in Expression (1) reduces, and hence the Bragg wavelength shows a smaller value. As a result, as shown in FIG. 3, the relationship between the Bragg wavelength and the temperature shifts to the direction in which the Bragg wavelength reduces in the extremely low temperature region relative to the relationship shown in FIG. 12.

In the relationship shown in FIG. 3, a Bragg wavelength change caused by a temperature change enlarges in the extremely low temperature region as compared to the relationship shown in FIG. 12. In other words, in the configuration illustrated in FIG. 11, the sensor sensitivity of the FBG sensor portion 2 reduces in the extremely low temperature region. In contrast, in the configuration illustrated in FIG. 1, a compressive force occurs in the FBG sensor portion 2 as a result of the curving of the substrate 3 when the temperature reaches the extremely low temperature region. Accordingly, the Bragg wavelength shows a smaller value in the extremely low temperature region. Therefore, as compared to the conventional configuration, in the extremely low temperature region, the sensor sensitivity is improved, and hence temperature measurement can be performed with higher accuracy.

Meanwhile, in the temperature region of 50° C. or more (hereinafter referred to as "high temperature region"), such warping that the substrate 3 is convex in an upward direction, that is, warping reverse to the forward warping (hereinafter referred to as "reverse warping") occurs in the substrate 3. When the reverse warping occurs in the substrate 3 as described above, as shown in FIG. 3, the relationship between the Bragg wavelength and the temperature shifts to the direction in which the Bragg wavelength increases in the high temperature region relative to the relationship shown in FIG. 12.

In the relationship shown in FIG. 3, the Bragg wavelength change caused by the temperature change enlarges not only in the extremely low temperature region but also in the high temperature region as compared to the relationship shown in FIG. 12. Therefore, as compared to the conventional configuration, also in the high temperature region, the sensor sensitivity is improved, and hence temperature measurement can be performed with higher accuracy.

High-density and high-accuracy temperature measurement can be performed by adopting a configuration in which the configurations each illustrated in FIG. 1 continuously lie in a row through the exploitation of a feature in that the optical fiber temperature sensor enables multipoint measurement.

In addition, a material for each of the first substrate main body 31 and the second substrate main body 32 is, for example, fiber reinforced plastic. More specifically, for example, carbon fiber reinforced plastic (CTE=about 0 ppm/K) can be adopted as the material for the first substrate main body 31, and glass fiber reinforced plastic (CTE=about 10 ppm/K) can be adopted as the material for the second substrate main body 32.

A strain that can contribute to an improvement in sensor sensitivity can be generated merely by: using the fiber reinforced plastic as the material for each of the first substrate main body 31 and the second substrate main body 32 to produce the substrate 3 having a length of 20 mm and a thickness of 1 mm; and warping the substrate 3 in a warping amount of 20 µm. In addition, the fiber reinforced plastic is used as the material for each of the first substrate main body 31 and the second substrate main body 32, and hence the warping amount can be freely regulated through the combination of a fiber and a resin. The sensor sensitivity can also be freely regulated by regulating the warping amount.

In addition, the damage of the FBG sensor portion 2 by, for example, impact from the outside can be suppressed because the FBG sensor portion 2 is embedded in the second substrate main body 32.

Figure 4:
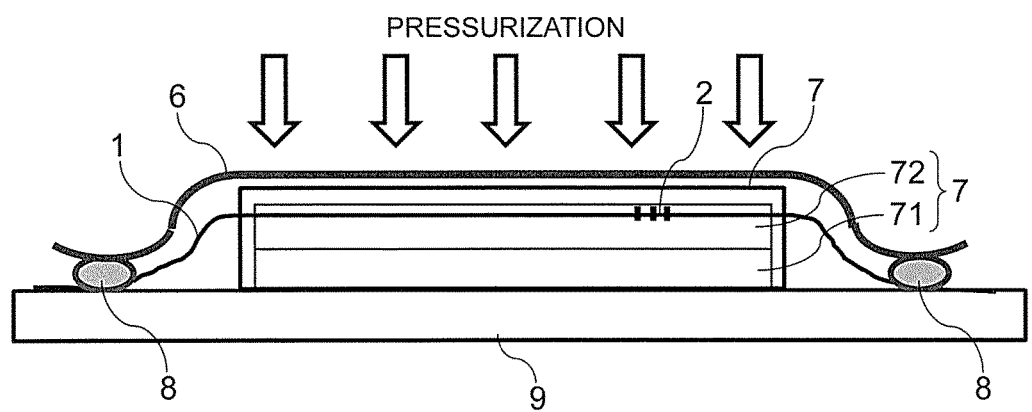
FIG. 4 is an explanatory diagram for illustrating a method of manufacturing the optical fiber temperature sensor in the first embodiment of the present invention.

Next, a method of manufacturing the optical fiber temperature sensor in the first embodiment is described with reference to FIG. 4. FIG. 4 is an explanatory diagram for illustrating the method of manufacturing the optical fiber temperature sensor in the first embodiment of the present invention.

First prepregs for the first substrate main body 31 and second prepregs for the second substrate main body 32 are prepared as prepregs to be used at the time of the manufacture of the optical fiber temperature sensor. The first prepregs are prepregs for producing the first substrate main body 31, and the second prepregs are prepregs for producing the second substrate main body 32.

First, as illustrated in FIG. 4, the plurality of first prepregs are sequentially laminated on a surface plate 9 to produce a first forming material 71.

Next, the plurality of second prepregs are sequentially laminated on the first forming material 71. Subsequently, the plurality of second prepregs are further sequentially laminated under a state in which the optical fiber 1 is arranged so that the FBG sensor portion 2 is positioned on the second prepregs that are laminated. Thus, a second forming material 72 is produced. Thus, the FBG sensor portion 2 is in state of being sandwiched between the layers of the second prepregs. The FBG sensor portion 2 in state of being sandwiched between the layers of the second prepregs is desirably arranged in a region where a compressive stress occurs in association with the forward warping of the substrate 3 as illustrated in FIG. 2.

Next, the entirety of a forming material 7 forming the first forming material 71 and the second forming material 72 is covered with a bagging film 6, and is sealed with a sealing material 8. After the sealing with the sealing material 8, an exhaust pump (not shown) is actuated to pressurize the forming material 7, which has been brought into a vacuum state, under atmospheric pressure (about 1 atm).

Subsequently, the forming material 7 is heated under pressure by an autoclave method. Thus, the optical fiber temperature sensor can be manufactured. Here, the autoclave method is a method involving heating a forming material placed in an autoclave whose temperature and pressure can each be controlled under pressure (e.g., holding a temperature of 120° C. under 3 atm for 3 hours) to cure and form the material. The conditions under which the forming material 7 is heated under pressure vary depending on the kinds of fiber and resin forming the forming material 7.

The optical fiber temperature sensor illustrated in FIG. 1 described in the foregoing can be manufactured by performing such manufacturing steps as described above.

The method of manufacturing the optical fiber temperature sensor in the first embodiment is not limited to the method listed above, that is, the method involving sandwiching the FBG sensor portion 2 between the layers of the second prepregs and heating the resultant under pressure by the autoclave method, and any method, such as a method involving manufacturing the sensor with plates each made of fiber reinforced plastic, may be adopted. When the plates each made of fiber reinforced plastic are used, a method involving forming a groove in one of the two plates in advance, placing the optical fiber 1 in the groove, and then sandwiching the optical fiber between the grooved plate and the other plate may be adopted.

As described above, according to the first embodiment, the optical fiber temperature sensor includes: the substrate having the first substrate main body, and the second substrate main body, which has a coefficient of thermal expansion larger than that of the first substrate main body, and is bonded to the first substrate main body; and the optical fiber having the FBG sensor portion for measuring a temperature from a relationship between a Bragg wavelength and the temperature, and the optical fiber is configured to be embedded in the second substrate main body so that the FBG sensor portion is positioned in the second substrate main body.

Thus, a Bragg wavelength change caused by a temperature change enlarges. Accordingly, the sensitivity of the sensor is improved, and hence temperature measurement can be performed with higher accuracy. In addition, the FBG sensor portion is embedded in the substrate, and hence a direct force from the outside is prevented from being applied to the FBG sensor portion. As a result, the damage of the FBG sensor portion can be suppressed. In other words, the configuration according to the first embodiment can suppress the damage of the FBG sensor portion by, for example, impact from the outside while achieving high-accuracy temperature measurement in a wide temperature region.

In the first embodiment, a case in which the fiber reinforced plastic is used as the material for each of the first substrate main body 31 and the second substrate main body 32 has been listed, but the material is not limited thereto, and any material may be used for each of the main bodies as long as the optical fiber 1 can be embedded in the second substrate main body 32.

Second Embodiment

In the foregoing first embodiment, a case in which the first substrate main body 31 of the substrate 3 of the optical fiber temperature sensor is bonded to the temperature evaluation object 5 has been described. In contrast, in a second embodiment of the present invention, a case in which the second substrate main body 32 of the substrate 3 of an optical fiber temperature sensor is bonded to the temperature evaluation object 5 is described. In the second embodiment, the description of a point identical to that of the foregoing first embodiment is omitted, and a point different from that of the foregoing first embodiment is mainly described.

Figure 9:
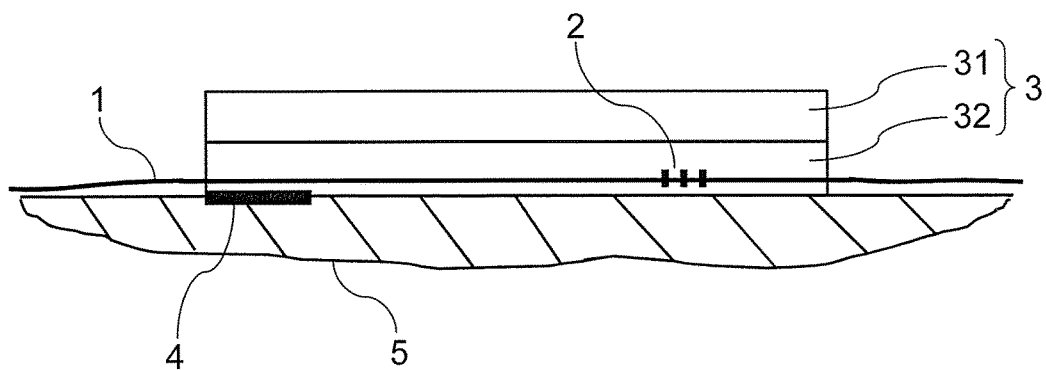
FIG. 9 is a sectional view for illustrating the configuration of an optical fiber temperature sensor in a second embodiment of the present invention.
Figure 10:
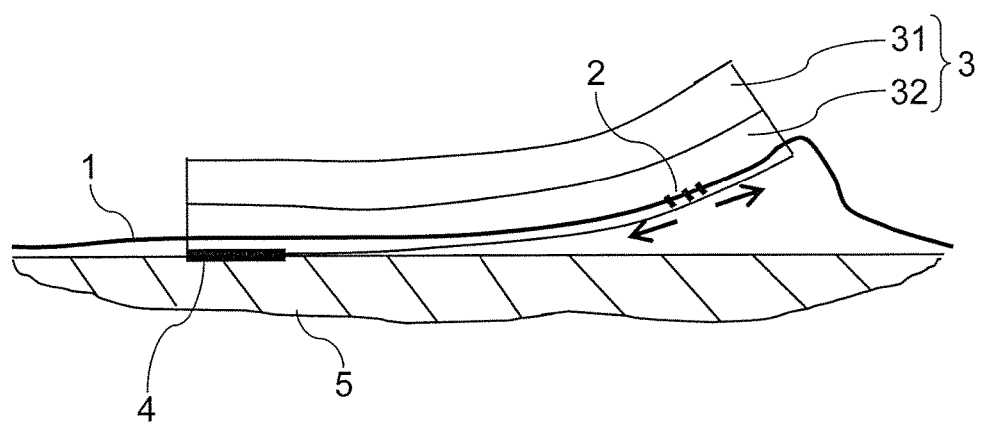
FIG. 10 is a schematic view for illustrating a state in which the substrate of the optical fiber temperature sensor of FIG. 9 curves under an environment in a high temperature region.

FIG. 9 is a sectional view for illustrating the configuration of the optical fiber temperature sensor in the second embodiment of the present invention. FIG. 10 is a schematic view for illustrating a state in which a substrate 3 of the optical fiber temperature sensor of FIG. 9 curves under an environment in the high temperature region.

In FIG. 9, in the optical fiber temperature sensor in the second embodiment, unlike the foregoing first embodiment, the rear surface of the first substrate main body 31 is bonded to the front surface of the second substrate main body 32 having a coefficient of thermal expansion larger than the coefficient of thermal expansion of the first substrate main body 31. The optical fiber 1 is embedded in the second substrate main body 32 so that the FBG sensor portion 2 is positioned in the second substrate main body 32.

In the optical fiber temperature sensor illustrated in FIG. 9, when the temperature of the temperature evaluation object 5 reaches the high temperature region, as illustrated in FIG. 10, such warping that the substrate 3 is convex in a downward direction, that is, forward warping occurs in the substrate 3 by virtue of the difference in coefficient of thermal expansion between the first substrate main body 31 and the second substrate main body 32. In addition, when the forward warping occurs in the substrate 3, a tensile strain, that is, a tensile stress is applied to the FBG sensor portion 2 embedded in the second substrate main body 32.

Thus, in the optical fiber temperature sensor illustrated in FIG. 9, the optical fiber 1 is embedded in the second substrate main body 32 so that the tensile stress is applied to the FBG sensor portion 2 in association with the forward warping of the substrate 3. Accordingly, a tensile force occurs in the FBG sensor portion 2 in the high temperature region. In addition, when the FBG sensor portion 2 is made closer to the bottom surface of the second substrate main body 32, the tensile stress is more easily applied to the FBG sensor portion 2.

Meanwhile, in the optical fiber temperature sensor illustrated in FIG. 9, when the temperature reaches the extremely low temperature region, such warping that the substrate 3 is convex in an upward direction, that is, reverse warping occurs in the substrate 3 by virtue of the difference in coefficient of thermal expansion between the first substrate main body 31 and the second substrate main body 32. In addition, when the reverse warping occurs in the substrate 3, a compressive strain, that is, a compressive stress is applied to the FBG sensor portion 2 embedded in the second substrate main body 32.

As is understood from the foregoing, in the optical fiber temperature sensor illustrated in FIG. 9, as in the foregoing first embodiment, a compressive force occurs in the FBG sensor portion 2 in the extremely low temperature region, and the tensile force occurs in the FBG sensor portion 2 in the high temperature region. Therefore, even when the optical fiber temperature sensor is configured as illustrated in FIG. 9, the same effects as those of the foregoing first embodiment are obtained.

The optical fiber temperature sensor in the second embodiment can be manufactured by the same method as the method of manufacturing the optical fiber temperature sensor described in the foregoing first embodiment.

Next, the optical fiber temperature sensor illustrated in FIG. 1 and the optical fiber temperature sensor illustrated in FIG. 9 are compared to each other. A case in which the first substrate main body 31 is made of carbon fiber reinforced plastic, the second substrate main body 32 is made of glass fiber reinforced plastic, and the temperature evaluation object 5 is an electronic part in equipment to be mounted on an artificial satellite (e.g., a capacitor, a diode, or a transistor) is considered as a specific example.

In the above-mentioned case, in the optical fiber temperature sensor illustrated in FIG. 1, the carbon fiber reinforced plastic serving as an electrically conductive material and the electronic part are brought into contact with each other, and in the optical fiber temperature sensor illustrated in FIG. 9, the glass fiber reinforced plastic serving as an electrically insulative material and the electronic part are brought into contact with each other. Here, the electronic part needs to be prevented from being brought into contact with the electrically conductive material because in general, the contact between the electronic part and the electrically conductive material may affect the operation of the electronic part.

Therefore, when the first substrate main body 31 is formed of the electrically conductive material, the second substrate main body 32 is formed of the electrically insulative material, and the temperature evaluation object 5 needs to be prevented from being brought into contact with the electrically conductive material, the configuration illustrated in FIG. 9 is desirably adopted as the configuration of the optical fiber temperature sensor.

In the above-mentioned case, when the configuration illustrated in FIG. 9 is adopted as the configuration of the optical fiber temperature sensor, the temperature of the electronic part can be directly measured. In addition, as the temperature of the electronic part increases, as illustrated in FIG. 10, a tensile force occurs in the FBG sensor portion 2 as a result of the curving of the substrate 3. Accordingly, the Bragg wavelength shows a larger value in the high temperature region. Therefore, as compared to the conventional configuration, in the high temperature region, the sensitivity of the sensor is improved, and hence temperature measurement can be performed with higher accuracy.

In addition, when the configuration illustrated in FIG. 9 is adopted as the configuration of the optical fiber temperature sensor, the temperature of the electronic part can be measured with high accuracy. Accordingly, the sophistication of thermal design can be achieved, and hence a reduction in cost for the sensor by the curtailment of a thermal design margin and an improvement in performance of the sensor can be expected.

As described above, according to the second embodiment, in contrast to the configuration of the foregoing first embodiment, the second substrate main body is bonded to the object of a temperature evaluation, and the optical fiber is configured to be embedded in the second substrate main body so that the tensile stress is applied to the FBG sensor portion in association with the forward warping of the substrate. Even in the case of such configuration, the same effects as those of the foregoing first embodiment are obtained.

In particular, when the first substrate main body 31 is formed of an electrically conductive material, the second substrate main body 32 is formed of an electrically insulative material, and the temperature evaluation object 5 needs to be prevented from being brought into contact with the electrically conductive material, it is desirable to adopt the configuration of the second embodiment rather than the configuration of the foregoing first embodiment as the configuration of the optical fiber temperature sensor.

REFERENCE SIGNS LIST

1 optical fiber, 2 FBG sensor portion, 3 substrate, 31 first substrate main body, 32 second substrate main body, 4 adhesive, 5 temperature evaluation object, 6 bagging film, 7 forming material, 71 first forming material, 72 second forming material, 8 sealing material, 9 surface plate, 11 core, 12 clad, 13 coating, 14 optical circulator, 15 ASE light source, 16 spectrum analyzer, 21 substrate, 22 bimetal

The invention claimed is:

1. An optical fiber temperature sensor, comprising:
   a substrate including a first substrate main body and a second substrate main body that has a coefficient of thermal expansion larger than that of the first substrate main body and is bonded to the first substrate main body; and
   an optical fiber including a fiber Bragg grating (FBG) sensor for measuring a temperature from a relationship between a Bragg wavelength and the temperature,
   wherein the optical fiber is embedded in the second substrate main body so that the FBG sensor is positioned in the second substrate main body.

2. The optical fiber temperature sensor according to claim 1,
   wherein the first substrate main body is bonded to an object of a temperature evaluation, and
   wherein the optical fiber is embedded in the second substrate main body so that a compressive stress is applied to the FBG sensor in association with forward warping of the substrate.

3. The optical fiber temperature sensor according to claim 2, wherein the first substrate main body and the second substrate main body are each made of fiber reinforced plastic.

4. The optical fiber temperature sensor according to claim 1,
   wherein the second substrate main body is bonded to an object of a temperature evaluation, and
   wherein the optical fiber is embedded in the second substrate main body so that a tensile stress is applied to the FBG sensor in association with forward warping of the substrate.

5. The optical fiber temperature sensor according to claim 4, wherein the first substrate main body and the second substrate main body are each made of fiber reinforced plastic.

6. The optical fiber temperature sensor according to claim 1, wherein the first substrate main body and the second substrate main body are each made of fiber reinforced plastic.

7. A method of manufacturing an optical fiber temperature sensor, the optical fiber temperature sensor including:
   a substrate including a first substrate main body and a second substrate main body that has a coefficient of thermal expansion larger than that of the first substrate main body and is bonded to the first substrate main body; and
   an optical fiber including a fiber Bragg grating (FBG) sensor for measuring a temperature from a relationship between a Bragg wavelength and the temperature,
   with first prepregs for the first substrate main body and second prepregs for the second substrate main body,
   the method comprising the steps of:

sequentially laminating the first prepregs to produce a first forming material;

sequentially laminating the second prepregs on the first forming material, followed by further sequential lamination of the second prepregs under a state in which the optical fiber is arranged so that the FBG sensor is positioned on the second prepregs that are laminated, to thereby produce a second forming material; and heating the first forming material and the second forming material under pressure.

* * * * *